US012000732B2

(12) United States Patent
Williams (10) Patent No.: US 12,000,732 B2
(45) Date of Patent: *Jun. 4, 2024

(54) BALANCED LIGHT DETECTOR

(71) Applicant: UT-Battelle, LLC, Oak Ridge, TN (US)

(72) Inventor: Brian P. Williams, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,147

(22) Filed: Jan. 23, 2023

(65) Prior Publication Data
US 2023/0417596 A1     Dec. 28, 2023

Related U.S. Application Data

(63) Continuation of application No. 17/472,869, filed on Sep. 13, 2021, now Pat. No. 11,561,130, which is a
(Continued)

(51) Int. Cl.
*G01J 1/18* (2006.01)
*G01J 1/42* (2006.01)
(Continued)

(52) U.S. Cl.
CPC .............. *G01J 1/18* (2013.01); *G01J 1/4228* (2013.01); *G06F 7/588* (2013.01); *H05B 47/11* (2020.01);
(Continued)

(58) Field of Classification Search
CPC .... G01J 1/18; G01J 1/16; G01J 1/1626; G01J 1/4228; G01J 2001/186; G01J 2001/444;
(Continued)

(56) References Cited

U.S. PATENT DOCUMENTS

| 5,606,277 A | 2/1997 | Feliz |
| 6,242,732 B1 | 6/2001 | Rantakari |

(Continued)

FOREIGN PATENT DOCUMENTS

| CN | 105157829 | 12/2012 |
| CN | 205452318 | 8/2016 |
| WO | 2012/078169 | 6/2012 |

OTHER PUBLICATIONS

Stefszky, M. S. et al., "Balanced Homodyne Detection of Optical Quantum States at Audio-Band Frequencies and Below", Quantum Physics, May 15, 2012, available at arXiv: 1205.3229v1, pp. 1-16.
(Continued)

*Primary Examiner* — John R Lee
(74) *Attorney, Agent, or Firm* — Warner Norcross + Judd LLP (57) ABSTRACT

A system and method with AC coupling that reserves photodiode bandwidth in a biased configuration, allows optimal transimpedance amplifier performance, retains DC signal measurement capability, and does not introduce noise into the balanced detection signal.

11 Claims, 6 Drawing Sheets

Related U.S. Application Data continuation of application No. 16/998,678, filed on Aug. 20, 2020, now Pat. No. 11,118,964.

(60) Provisional application No. 62/889,614, filed on Aug. 21, 2019.

(51) Int. Cl.
*G06F 7/58* (2006.01)
*H05B 47/11* (2020.01)
*G01J 1/44* (2006.01)

(52) U.S. Cl.
CPC ... *G01J 2001/186* (2013.01); *G01J 2001/444* (2013.01); *G01J 2001/446* (2013.01)

(58) Field of Classification Search
CPC ........ G01J 2001/446; G01J 2001/4446; G06F 7/588; G06F 7/58; H05B 47/11; H05B 47/105; H05B 47/10
See application file for complete search history.

(56) References Cited

U.S. PATENT DOCUMENTS

| | | |
|---|---|---|
| 7,405,386 B2 | 7/2008 | Shimizu et al. |
| 10,585,645 B2 | 3/2020 | Qi |
| 11,118,964 B2 * | 9/2021 | Williams ............... G01J 1/44 |
| 11,561,130 B2 * | 1/2023 | Williams ............... G01J 1/4228 |
| 2015/0338269 A1 | 11/2015 | Frank et al. |
| 2020/0162248 A1 | 5/2020 | Qi et al. |
| 2021/0036846 A1 | 2/2021 | Grice et al. |
| 2021/0055155 A1 | 2/2021 | Williams |
| 2022/0205838 A1 | 6/2022 | Williams |

OTHER PUBLICATIONS

Robinson, E.C. et al., "Balanced detection for interferometry with a noisy source", Review of Scientific Instruments, vol. 83, Issue 6, Jun. 2012, pp. 1-17.

* cited by examiner

BALANCED LIGHT DETECTOR

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of light detection, and more particularly toward balanced detection of light.

BACKGROUND

Conventional circuits for detecting light include photodiode receiver circuits. These photodiode receiver circuits often amplify incoming signals 1 k, 1M, or more. In the case of transimpedance amplifiers (TIAs), a photodiode current is converted to a voltage in the amplification process. The outputs of these conventional circuits are limited by their supply voltage which may be ±5V, ±12V, etc. Awareness is then provided with respect to currents generated from the photodiode. Even small DC voltages under large amplification can result in "railing" the amplifier. For example, a 10 mA DC signal with a transimpedance gain of 100 k would result in a 1 kV output, which the amplifier cannot provide.

Often, the DC signal has no value, and the AC signal instead is the signal of interest. In several conventional circuits, attempts have been made to remove the DC signal by AC coupling the photodiode output current. These attempts, however, have been inadequate or cause adverse consequences. In other words, there are a variety of conventional methods that attempt to remove the DC signal, but they have one or more drawbacks, including, reduction of the operational bandwidth of the photodiode, reduction of bandwidth and stability of the transimpedance amplifier, loss of DC signal information, and insertion of path dependent noise into a balanced detector. The last of these is of interest to light detection because noise common to each of the two detectors in a balanced detector is removed from the final signal. Attempts to remove noise common to both detectors are often made in conventional balanced detection, but these attempts yield one or more drawbacks similar to those previously identified.

SUMMARY

In one embodiment, a system and method are provided with AC coupling that reserves photodiode bandwidth in a biased configuration, allows optimal transimpedance amplifier performance, retains DC signal measurement capability, and does not introduce noise into the balanced detection signal.

In general, one innovative aspect of the subject matter described herein is a light detector comprising a first light detector having an first output, the first light detector configured to provide a first electrical signal from the first output, the first electrical signal representing light intensity of light received by the first light detector; a first amplifier coupled to the first output of the first light detector, the first amplifier operable to amplify the first electrical signal to yield a first amplified electrical signal; a second light detector having a second output, the second light detector configured to generate a second electrical signal from the second output, the second electrical signal representing light intensity of light received by the second light detector; a second amplifier coupled to the second output of the second light detector, the second amplifier operable to amplify the second electrical signal to yield a second amplified electrical signal; and a common offset circuit operably coupled to the first and second outputs of the first and second light detectors, the common offset circuit configured to apply a common offset to the first and second outputs, whereby noise introduced to the first and second outputs by the common offset is common to the first and second outputs.

The foregoing and other embodiments can each optionally include one or more of the following features, alone or in combination. In particular, one embodiment includes all the following features in combination.

In some embodiments, the first and second electrical signals are indicative of quantum noise.

In some embodiments, the light detector comprises processing circuitry operable to output a difference signal indicative of a difference between the first amplified electrical signal and the second amplified electrical signal.

In some embodiments, the light detector comprises the light detector wherein noise introduced to the first and second outputs by the common offset is absent from the difference signal that is output from the processing circuitry.

In some embodiments, the light detector comprises the processing circuitry and is operable to generate one or more random bits of data based on the difference signal, wherein the one or more random bits of data are indicative of quantum noise of light received by the first and second light detectors.

In some embodiments, the light detector comprises conversion circuitry operable to convert the first amplified electrical signal to a first digitized signal representative of the first amplified electrical signal, the conversion circuitry operable to convert the second amplified electrical signal to a second digitized signal representative of the second amplified electrical signal.

In some embodiments, the light detector comprises conversion circuitry and is operable to generate a digitized difference signal indicative of a difference between the first and second digitized signals, wherein noise introduced to the first and second outputs by the common offset is substantially absent from the digitized difference signal.

In some embodiments, the light detector comprises first and second electrical signals including a background signal superimposed with quantum noise.

In some embodiments, the light detector comprises the common offset circuit including a common DC current offset shared by the first and second outputs.

In some embodiments, the light detector comprises the common offset circuit that is a current sink that removes a current from the first and second outputs according to the common DC current offset.

In some embodiments, the light detector comprises the common offset circuit that is coupled to the first and second outputs via first and second diodes, wherein the common DC current offset is applied to the first output via the first diode and to the second output via the second diode, wherein the first and second diodes substantially prevent interaction between the first and second amplifiers via the common offset circuit.

In general, one innovative aspect of the subject matter described herein is a random number generator (RNG) operable to generate one or more random bits of data, said RNG comprising a first light detector having a first output, the first light detector configured to provide a first electrical signal from the first output, the first electrical signal representing light intensity of light received by the first light detector; a first amplifier coupled to the first output of the first light detector, the first amplifier operable to amplify the first electrical signal to yield a first amplified electrical signal; a second light detector having a second output, the second light detector configured to generate a second electrical signal from the second output, the second electrical signal representing light intensity of light received by the second light detector; a second amplifier coupled to the second output of the second light detector, the second amplifier operable to amplify the second electrical signal to yield a second amplified electrical signal; a common offset circuit operably coupled to the first and second outputs of the first and second light detectors, the common offset circuit configured to apply a common offset to the first and second outputs, whereby noise introduced to the first and second outputs by the common offset is common to the first and second outputs; and processing circuitry configured to generate a difference signal based on the first and second amplified electrical signals, the difference signal being indicative of quantum noise, the processing circuitry configured to output the one or more random bits of data based on the difference signal.

In some embodiments, the processing circuitry includes conversion circuitry operable to convert the first and second amplified electrical signals respectively to first and second digitized signals, and wherein the difference signal is a digitized difference signal based on a difference between the first and second digitized signals.

In some embodiments, the conversion circuitry includes a differential amplifier operable to generate the difference signal based on the first and second amplified electrical signals, and wherein the conversion circuitry includes an analog-to-digital converter operable to convert the difference signal to a digitized difference signal.

In some embodiments, the one or more random bits are based on the digitized difference signal.

In some embodiments, the common offset circuit includes a common DC current offset shared by the first and second outputs.

In some embodiments, the common offset circuit is a current sink that removes a current from the first and second outputs according to the common DC current offset.

In some embodiments, the common offset circuit is coupled to the first and second outputs respectively via first and second diodes, wherein the common DC current offset is applied to the first output via the first diode and to the second output via the second diode, wherein the first and second diodes substantially prevent interaction between the first and second amplifiers via the common offset circuit.

In some embodiments, the RNG comprises a quantum noise source configured to generate light, wherein the light that is output from the quantum noise source is directed to the first and second light detectors.

In general, one innovative aspect of the subject matter described herein as a method of detecting light, said method comprising generating a first output from a first light detector based on light detected by the first light detector; amplifying the first output to yield a first amplified electrical signal; generating a second output from a second light detector based on light detected by the second light detector; amplifying the second output to yield a second amplified electrical signal; applying a common offset to the first and second outputs, wherein noise introduced by the common offset is common to both the first and second outputs; and generating a difference signal that is based on the first and second amplified electrical signals, wherein the noise introduced to the first and second outputs by the common offset is substantially absent from the difference signal.

In some embodiments, wherein sampling the difference signal to yield one or more random digital bits representative of quantum noise in the light detected by the first and second light detectors.

In some embodiments, wherein applying a common offset includes applying a common DC current offset to the first and second outputs.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

A system and method in accordance with one embodiment provides AC coupling that reserves photodiode bandwidth in a biased configuration, allows optimal transimpedance amplifier performance, retains DC signal measurement capability, and does not introduce noise into the balanced detection signal.

In one embodiment, balanced detection is provided in conjunction with a system and method for light detection in which classical noise common to two detectors is removed by subtracting the individual detector signals from one another. This may enable very sensitive measurements such as beam positioning measurements, laser absorption spectroscopy, and optical homodyne detection. In one embodiment, the signal to be detected and amplified is an AC signal, and the amplification process involves a DC signal to be eliminated while still meeting amplification and bandwidth performance for the AC signals. A system and method of one embodiment includes AC coupling a balanced detector that preserves photodiode bandwidth in a biased configuration, allows optimal transimpedance amplifier performance, retains DC signal measurement capability, and does not introduce additional noise into the balanced detection signal.

In one embodiment, a detector is provided with an AC coupling mechanism that is balanced such that no new independent noise sources are introduced. A DC signal value may be retained. The detector may be provided for sensitive balanced detection applications, and can be provided to detected shot noise from an LED or light source, which can then be used in generating a random number.

Figure 1:
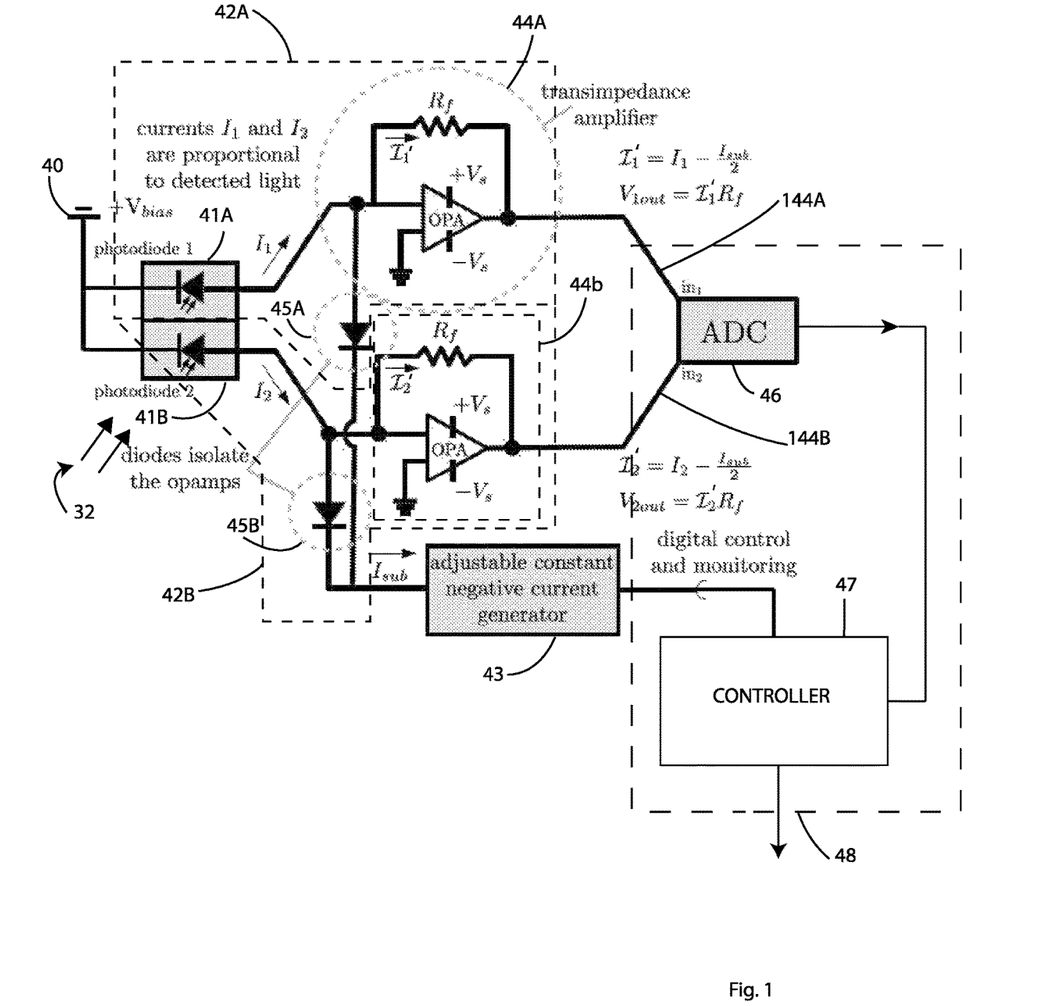
FIG. 1 shows a representative view of a detector in accordance with one embodiment of the present disclosure.
Figure 3:
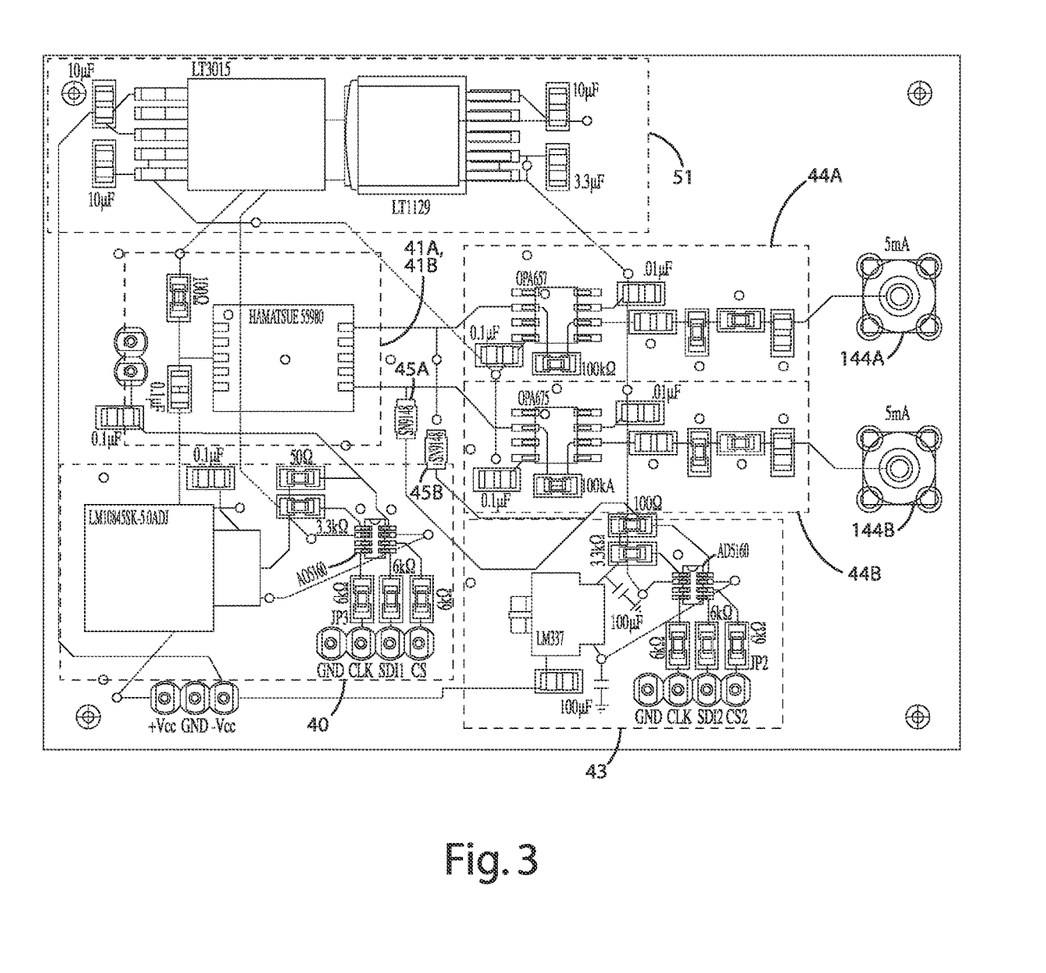
FIG. 3 shows a printed circuit board of a detector in accordance with one embodiment of the present disclosure.
Figure 4:
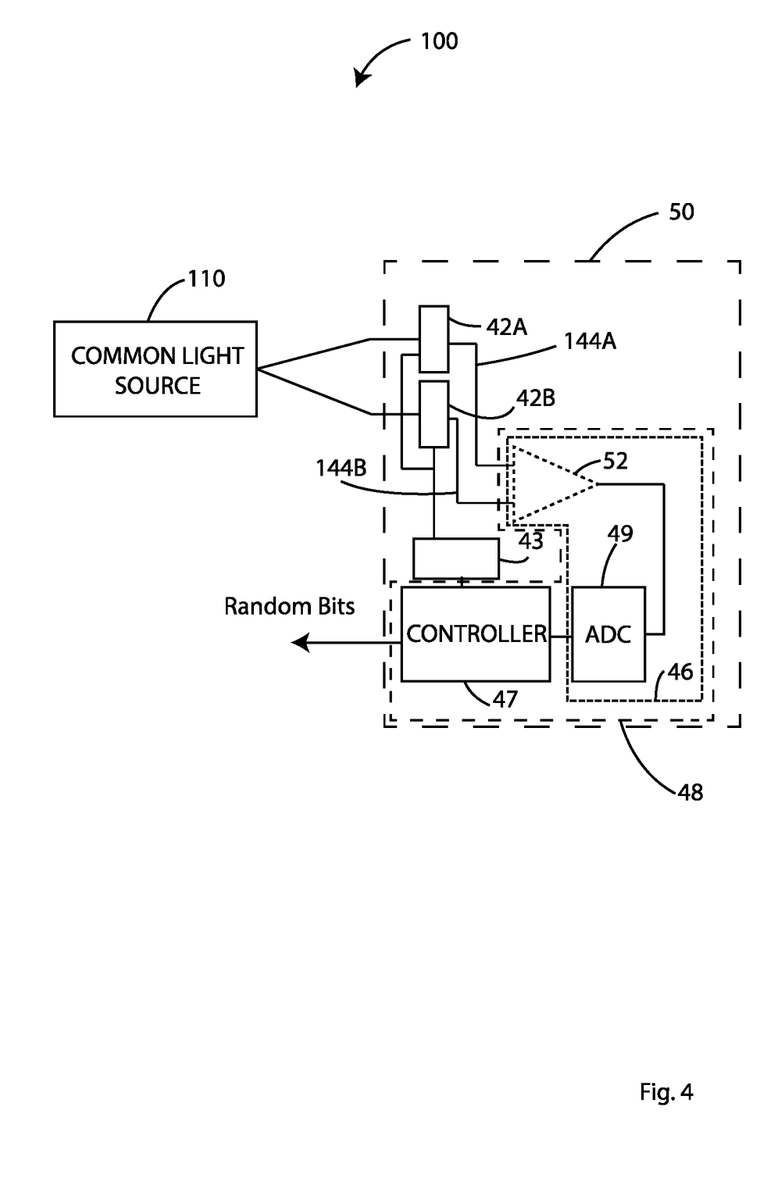
FIG. 4 depicts a quantum random number generator in accordance with one embodiment.

A detector 50 in the illustrated embodiments of FIGS. 1, 3, and 4 includes a plurality of photodetectors that respectively sense light or photons, such as light output from a light source 110, as described herein. For instance, the detector 50 may include a first photodetector 42A and a second photodetector 42B configured to generate respectively first and second electrical signals 144A, 144B representative of an intensity level (e.g., light intensity) of light respectively received by the first and second photodetectors 42A, 42B.

The first and second photodetectors 42A, 42B in the illustrated embodiment of FIG. 1 include, respectively, first and second light detectors 41A, 41B. The first and second light detectors 41A, 41B may be photo diodes, each of which may be sensitive to variations in light received by the photo diodes. The photo diode may yield variations in the electrical current flowing through the photo diode in response to variations in the light received by the photo diode.

The first and second light detectors 41A, 41B may be biased via a bias source 40. In the illustrated embodiment, the first and second light detectors 41A, 41B are reverse biased, and operable to yield current flow in response to reception of light. It is to be understood that the first and second light detectors 41A, 41B may be configured differently and are not limited to this construction. The first and second light detectors 41A, 41B may be any type of light detector operable to provide a current signal indicative of light received respectively by the first and second light detectors 41A, 41B.

The first light detector 41A in the illustrated embodiment may be operably coupled to a first amplifier 44A, which may be configured to amplify the first detector signal output from the first light detector 41A to yield a first amplified electrical signal or first electrical signal 144A. Likewise, the second light detector 41B may be operably coupled to a second amplifier 44B, which may be configured to amplify the second detector signal output from the second light detector 41B to yield a second amplified electrical signal or second electrical signal 144B.

As described herein, a common DC current offset or current sink may be introduced by common offset circuitry into the circuit as seen in FIGS. 1 and 3. This common sink may remove a current Isub/2 from each path I1, I2, which correspond to outputs from the first and second light detectors 41A, 42B. For instance, the currents I1, I2 may be proportional to the light detected by the first and second light detectors 41A, 41B.

Introduction of the first and second diodes 45A, 45B in the paths I1, I2 may ensure there is substantially no detector signal shared between the two operational amplifiers of the first and second amplifiers 44A, 44B. In other words, the first and second diodes 45A, 45B may isolate the operational amplifiers of the first and second amplifiers 44A, 44B, which may be transimpedance amplifiers with outputs corresponding to $V_{1out}=I'_1 * R_f$ where $I'_1 = I_1 - I_{sub}/2$ and $V_{2out}=I'_2 * R_f$ may determine the gain of the amplifier, and $I_{sub}$ may correspond to the common offset applied to the first and second detector outputs of the first and second light detectors 41A, 41B. As described herein, $I_{sub}$ may be adjustable via control of the common offset circuitry 43 via controller 47 of processing circuitry 48.

Any noise added to the paths I1, I2 by the current sink may be subtracted away in balanced detection post-processing (e.g., subtracting the values of V1out and V2out, which correspond to the first and second amplified electrical signals 144A, 144B). By adjusting $I_{sub}$ and monitoring outputs V1out and V2out, a null point can be identified where the first and second light detectors 41A, 41B are AC coupled. In the event of unbalanced light fields at the first and second light detector 41A, 41B, an offset point may be determined. The offset point may not be exactly 0 in one embodiment. However, for purposes of disclosure, the light fields at the first and second light detectors 41A, 41B are considered to have approximately the same amplitude. For instance, in the case of the detector 50 being used for balanced detection, the light fields are considered very close in amplitude.

In one embodiment, the current from each of the first and second light detectors 41A, 41B may be matched to approximately equal $V_S/R_f$ in order to operate in an AC coupled regime, where $V_S$ the difference the upper and lower rails of the operational amplifiers of the first and second amplifiers 44A, 44B.

In the illustrated embodiment of FIG. 1, with knowledge of $I_{sub}$ and the output voltages $V_{1out}$ and $V_{2out}$, DC values for the first and second detector outputs (e.g., $I_1$ and $I_2$) can be determined as follows:

$$I'_i = I_i - \frac{I_{sub}}{2} \to 0, \text{ ("AC coupled")}$$

$$V_{iout} = I'_i * R_f$$

$$I_i = \frac{V_{iout}}{R_f} + \frac{I_{sub}}{2}$$

The determined DC values or bias in $I_i$ can be used as basis for adjusting the value of $I_{sub}$ in accordance with one or more embodiments described herein.

In one embodiment, the first and second detector signals (e.g., paths I1, I2) of the first and second light detectors 41A, 41B may be coupled to a common offset circuitry 43 configured to apply a common offset to the first and second detector signals. This common offset may include noise, as described herein, but the noise of the common offset may be common to both signals. As a result, in one embodiment, the noise of the common offset can be cancelled from signals based on the first and second detector signals by differencing such signals based on the first and second detector signals. Examples of signals based on the first and second signals include the first and second electrical signals 144A, 144B output respectively from the first and second amplifiers 44A, 44B or digitized forms of the first and second electrical signals 144A, 144B obtained by analog-to-digital conversion.

In one embodiment, AC coupling may be achieved in which a common offset (e.g., a common current sink) is shared between two current amplification paths. These paths may be isolated from each other by the first and second diodes 45A, 45B such that there is no interaction between the amplification processes. Any classical noise generated by the negative current generation is common and can be subtracted out. In other words, AC coupling can be achieved with no added unique noise sources (e.g., common noise can be subtracted out). AC and DC measurement information from each of the first and second light detector 41A, 41B can be retained. Full bandwidth operation is provided in a manner independent of a DC bias in the first and second light detectors 41A, 41B (e.g., sunshine or no sunshine).

Although described in conjunction with first and second in relation to several components—it is to be understood that a plurality of such components may be implemented in one or more embodiments described herein, including multiple pairs of first and second components and first, second, and one or more additional versions of such components.

The first and second amplifiers 44A, 44B in one embodiment may be transimpedance amplifiers, which include operational amplifiers such as an optical parametric amplifier. For instance, the first and second amplifiers 44A, 44B may be configured to convert current to a voltage and amplify the signal proportional to a value of the feedback resistor $R_f$, with $V_{out}=IR_f$. The voltage can be measured, as described herein, by conversion circuitry 49 to translate the analog voltage to a digital form or a binary representation. The voltage may be provided to additional circuitry (e.g., an analog differencing circuit 52) prior to being sampled or measured by the conversion circuitry 49.

The amplifiers 44A, 44B have a bandwidth corresponding to a range of frequencies that it can "faithfully" amplify and turn into a measureable voltage. This bandwidth may be improved by applying a bias voltage from the bias source 40 to the first and second light detectors 41A, 41B. As described herein, there is a limit to the current that can be amplified.

The first and second amplifiers 44A, 44B may be powered by a power source 51, which may take the form of positive and negative rails (e.g., Vs+ and Vs−) for the first and second amplifiers 44A, 44B. It is noted there is a tradeoff between the gain of an amplifier and the headroom offered by the positive and negative rails. The first and second amplifiers 44A, 44B may be configured to provide a target degree of gain for the signal to be amplified (e.g., the first and second detector outputs) based on the variability and the DC bias of the signal. For instance, if the DC bias is high, while the variability is relatively small, with the variability being of interest, both a high gain and a higher voltage rail may be specified. On the other hand, if the DC bias is low, a lower voltage rail with the same gain may be sufficient. There are limits and constraints with respect to increasing the rail voltage for high gain applications.

For instance, a 100 mA average current (DC bias) input into one of the first and second amplifiers 44A, 44B with $R_f$=100 k, V=IR=(100 mA)*100 kΩ=100V. This voltage is far above conventional component specifications for 5V or 12V supplies. The amplifier would be saturated and would not provide useful measurements. As a result, the DC current or DC bias, which may have no information content, may yield unusable results.

The DC value of the input signals to each of the first and second amplifiers 44A, 44B, also considered the respective outputs of the first and second light detectors 41A, 41B may have no information content. For instance, the DC value may be an ambient light source, such as daylight that varies over time.

Balanced detection in accordance with one embodiment of the present disclosure may involve using two or more light detectors or photo diodes (e.g., the first and second light detectors 41A, 41B) to detect signals that include common and differential components. The DC values of light (e.g., the ambient light) in this configuration may be symmetric or near-symmetric with respect to the two or more light detectors, and can be substantially subtracted out via direct circuit processing, such as by a differential amplifier, or via indirect processing via digital techniques. Removal of the DC values may provide greater signal-to-noise ratio in measuring variance or AC components of the detected light relative to conventional systems, such as a single-diode detector.

In the illustrated embodiment of FIG. 1, the common offset is applied to the first and second detector outputs to control the DC bias in these outputs, enabling use of the first and second amplifiers 44A, 44B over a wide range of DC bias conditions with a specified level of amplification. This way, despite large variations in DC bias, such as DC background changes in the level of light received by the first and second light detectors 41A, 41B, the first and second amplifiers 44A, 44B are capable of amplifying the variations of interest by a specified gain. The components of the first and second amplifiers 44A, 44B in one embodiment may be specified for use with low voltage, commonly available voltage supplies, without the need for high voltage rails.

The common offset in the illustrated embodiment may be applied by the common offset circuitry 43, which may be controlled by the processing circuitry 48. The common offset may be variable such that the processing circuitry 48 may adjust the common offset based on the amount of DC bias detected in the first and second electrical signals 144A, 144B or in a signal based on the first and second electrical signals 144A, 144B. This way, despite changes in the DC bias, the common offset can be varied such that the signals received by the first and second amplifiers 44A, 44B are within specified limits and can be amplified according to specified gain.

The common offset may be determined in a variety of ways. In one embodiment, the controller 47 of the processing circuitry 48 may direct the common offset circuitry 43 to make course adjustments to the common offset to seek approximate balance between the first and second detector outputs of the first and second light detectors 41A, 41B. As an example, the common offset circuitry 43 may adjust $I_{sub}$ until $V_{1out} \rightarrow 0$ and $V_{2out} \rightarrow 0$. In one embodiment if an offset is needed such that $V_{1out}$ and $V_{2out}$ are not 0, the controller 47 may determine to adjust $I_{sub}$ until $V_{1out}=-V_{2out}$. This offset to $V_{1out}$ and $V_{2out}$ may substantially ensure that each opamp of the first and second amplifiers 44A, 44B operate in a similar manner (e.g., bandwidth and range). These adjustment steps may be repeated to achieve the target values of $V_{1out}$ and $V_{2out}$. The adjustment may run at start-up of the circuit, periodically or event based during operation, or continuously during operation.

In the illustrated embodiment of FIGS. 1 and 3, the common offset circuitry 43 is coupled to the first and second detector outputs of the first and second light detectors 41A, 41B via first and second diodes 45A, 45B. The first and second diodes 45A, 45B may prevent the first and second amplifiers 44A, 44B from affecting the each other's electrical output. For instance, the first and second diodes 45A, 45B may prevent operation of the first amplifier 44A from affecting the second electrical signal 144B output from the second amplifier 44B such that the second electrical signal 144B is not an accurate representation of the output of the second light detector 41B.

The electrical output of each photodetector 42A, 42B may have a large DC background (e.g., a constant voltage). In one embodiment, a small fluctuation representing quantum noise may be present within the electrical output of each photodetector 42A, 42B. In one embodiment, this quantum noise may be generated primarily from the light source 110.

To remove the DC background and measure the small quantum noise, the outputs of the first and second photodetectors 42A, 42B may be provided to processing circuitry 48 capable of outputting a difference signal indicative of a difference between the first and second electrical signals 144A, 144B. The processing circuitry 48 may include a controller 47 and a differencing circuitry 46, such as an optional analog differencing circuit 52 (e.g., a differential amplifier shown in FIG. 4) and conversion circuitry 49 capable of digitizing the output from the analog differencing circuit 52. In an alternative embodiment, the differencing circuitry 46 may be integrated into the controller 47 of the processing circuitry 48 or another controller. The differencing circuitry 46 may be digital in place of and/or in addition to the analog differencing circuit 52.

The differencing circuitry 46 may be capable of generating an analog signal or a digital signal representative of the difference between the first and second electrical signals 144A, 144B of the first and second photodetectors 42A, 42B. The conversion circuitry 49 of the differencing circuitry 46 may include an analog-to-digital converter configured to generate digitized signals representative of the first and second electrical signals 144A, 144B of the first and second photodetectors 42A, 42B, or an output from an analog differencing circuit 52.

In one embodiment, the controller 47 of the processing circuitry 48 may be capable of receiving one or more digital signals output from the conversion circuitry 49. As described herein, in an alternative embodiment, the conversion circuitry 49 may be integrated into the controller 47. The controller 47 in the illustrated embodiment of FIG. 1 may obtain, from the conversion circuitry 49, digital signals representative of the first and second electrical signals 144A, 144B and subtract one of the digitized signals from the other of the digitized signals to yield the digital output indicative of the difference between the first and second electrical signals 144A, 144B.

In one embodiment, the strong DC background provided in the first and second electrical signals 144A, 144B may be the result, at least in part, of the ambient intensity of light received by the first and second photodetectors 42A, 42B being stronger or more intense than quantum noise therein, such as the quantum noise provide by the light source 110. In one embodiment, the DC background may include bias current from the bias source 40 provided to bias the first and second light detectors 41A, 41B of the first and second photodetectors 42A, 42B to a level sufficient for detecting photons as described herein and to provide a current signal indicative of detected photons.

The detector 50 in one embodiment may provide substantially balanced detection of light received by the first and second photodetectors 42A, 42B, such that the strong DC background can be substantially canceled out. The detector 50 may be utilized in conjunction with detecting quantum noise despite the strong DC background, enabling effective detection of the relative small quantum noise. However, it is to be understood that the present disclosure is not limited to detecting quantum noise and may be used in conjunction with any balanced detection configuration.

In one embodiment, the strong DC background can be canceled out with the processing circuitry 48, leaving the quantum noises measured by the first and second photodetectors 42A-B. This configuration with first and second photodetectors 42A-B and processing circuitry 48 can form a balanced photoreceiver utilized in a variety of applications, including quantum random number generators. The output of processing circuitry 48 can be used in one or more applications as a truly random source; or as discussed herein, the processing circuitry 48 may be operable to generate a random number based on this truly random source.

Figure 2:
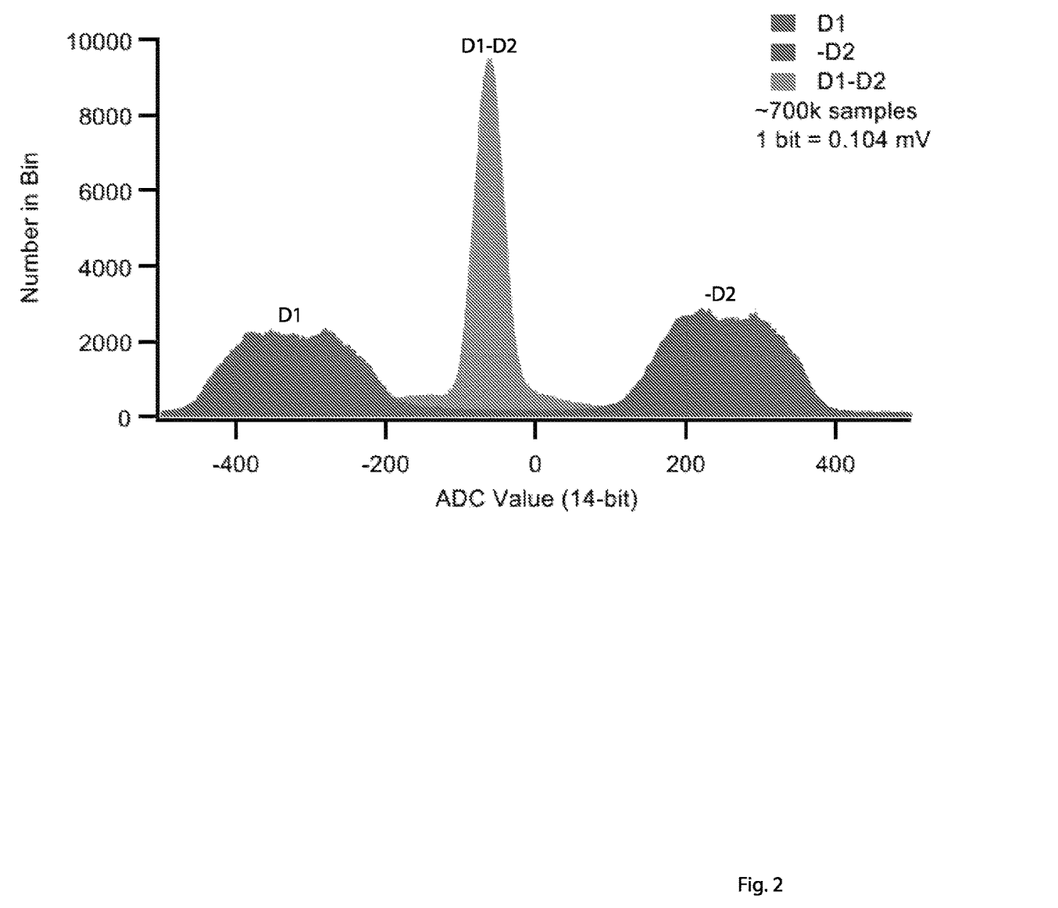
FIG. 2 shows a distribution of samples output from processing circuitry in accordance with one embodiment of the present disclosure.

In the illustrated embodiment of FIG. 2, experimental results of the circuit implementation in FIG. 3 are shown. By varying the current $I_{sub}$ using an adjustable constant current source implemented with a LM337 linear regulator (e.g., a form of the common offset circuitry) and a digitally controlled potentiometer, an AC coupled setting is achievable. As seen in FIG. 2, the D1 and −D2 curves are datasets from the first and second light detectors 41A, 41B, respectively. The D1-D2 dataset is the "differenced" signal which excludes common noise between the two paths or outputs of the first and second light detectors 41A, 41B. It is noted that differencing two independent signals without common noise would result in a D1-D2 curve with variance equal to the −D2 plus the D1 curve variance. Instead, the D1-D2 curve has a variance that is 3% of this value which demonstrates the effectiveness of the circuit in accordance with one embodiment of the present disclosure.

The processing circuitry 48 may include any and all electrical circuitry and components to carry out the functions and algorithms described herein. Generally speaking, the processing circuitry 48 may include one or more microcontrollers, microprocessors, and/or other programmable electronics that are programmed to carry out the functions described herein. The processing circuitry 48 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASIC s) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the processing circuitry 48, or they may reside in a common location within the processing circuitry 48. When physically distributed, the components may communicate using any suitable serial or parallel communication protocol, such as, but not limited to, CAN, LIN, FireWire, I2C, RS-232, RS-485, and Universal Serial Bus (USB).

A quantum random number generator (QRNG) system in accordance with one embodiment of the present disclosure is shown in FIG. 4 and designated 100. The QRNG 100 in the illustrated embodiment includes a light source 110 that is a quantum noise source for the QRNG 100. Examples of the light source 110 and a quantum random number generator are described in U.S. Pat. No. 10,585,645, entitled QUANTUM RANDOM NUMBER GENERATOR, filed Aug. 7, 2018, to Qi, and U.S. patent application Ser. No. 16,197,457, entitled QUANTUM KEY DISTRIBUTION USING A THERMAL SOURCE, filed Nov. 21, 2018, to Qi et al., and U.S. patent application Ser. No. 16/944,390, entitled CONTINUOUS VARIABLE QUANTUM SECRET SHARING, filed Jul. 31, 2020, to Grice et al.—the disclosures of which are incorporated by reference herein in their entirety.

The QRNG 100 in the illustrated embodiment includes a detector 50 in accordance with one or more embodiments described herein. It is to be understood that the present disclosure is not limited to the light source 110 described in connection with the illustrated embodiment, and that any type of configuration capable of providing photons or light, having quantum noise, to the detector 50 may utilized.

As described herein, the detector 50 may be configured to generate random bits of data. These random bits may be substantially truly random based on the inherent physical phenomena or quantum noise present in the light output from the light source 110 and detected by the first and second photodetectors 42A, 42B. In one embodiment of the present disclosure, the first and second photodetectors 42A, 42B along with the processing circuitry 48 are configured to provide a substantially balanced noiseless output indicative of the difference between light detected by the first and second photodetectors 42A, 42B despite variations in bias present within detector 50. This way, the random bits output from the detector 50 may be considered substantially truly random.

Figure 6:
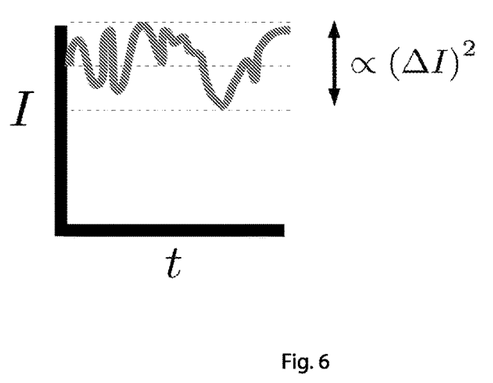
FIG. 6 shows changes in output for a light detector in accordance with one embodiment.
Figure 7:
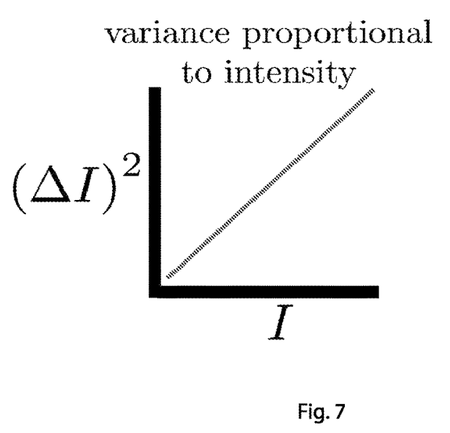
FIGS. 7-10 show variance in output for a light detector in accordance with one or more embodiments.

The QRNG 100 in the illustrated embodiment may harvest variance from a photonic light field (e.g., a light source 110) using balanced detection. An example of such variance is depicted in FIG. 6. An aspect of quantum noise from a light field is the variance (e.g., an AC related measurement) being linearly proportional to the light intensity (e.g., a DC value), as shown in FIG. 7.

Figure 8:
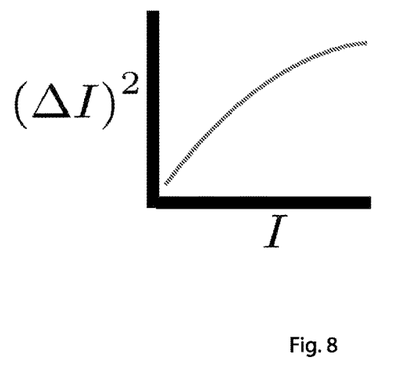

In order to obtain random data from the light field that is based on the quantum noise therein, several criteria are considered. For instance, having large variance may be helpful in yielding more bits. And, having linear dependence of the variant with respect to intensity may be helpful in accommodating changes in background intensity. The detector 50 in accordance with one embodiment has a bandwidth that is linearly proportional to intensity, in contrast to conventional RC filter designs (e.g., an RC filter disposed between a light detector and a corresponding amplifier) that have a bandwidth that is nonlinearly proportional to intensity, such as the nonlinear relationships depicted in FIG. 8. Even with classical noise cancellation, a conventional system having a nonlinear relationship between bandwidth and intensity may still yield results similar to those depicted in FIG. 8. Because variance is dependent on the bandwidth, avoiding the nonlinear relationship between bandwidth and intensity, as described herein in conjunction with the detector 50, may expand the usable bandwidth for the detector 50 and increase the available variance that can be measured.

Figure 9:
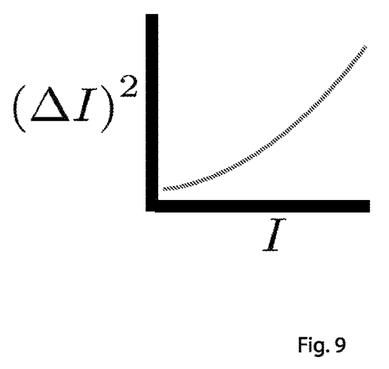
Figure 10:
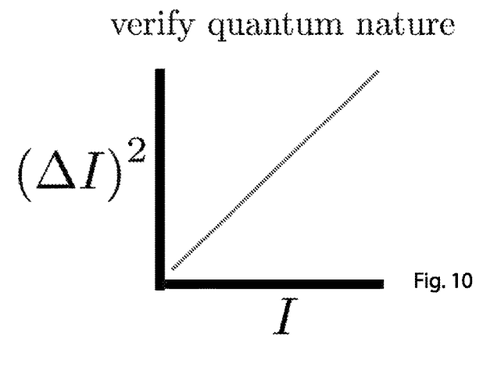

It is noted that independent current sinks (e.g., independent offsets) are also independent classical noise sources, which does not subtract away in a differencing operation. This extra noise can also lead to a nonlinear relationship between bandwidth and intensity, such as the nonlinear relationship depicted in FIG. 9. If such independent offsets are provided, yielding results similar to those shown in FIG. 9, data output from the random number generator may not be verifiable as quantum in origin. The detector 50 in one embodiment provides a common offset such that independent noise sources are absent from the outputs of the first and second light detectors 41A, 41B, and the noise introduced by the common offset can be removed in a differencing operation, yielding results that are verifiable as being similar to those depicted in FIG. 10. These results can be used as a random resource and converted to random bits, such as . . . 01100010111000111110000110111011000 . . . In other words, the detector 50 may provide a substantially constant bandwidth, low-noise, balanced detector for incorporation into the QRNG 100 to yield verifiably quantum based results.

Figure 5:
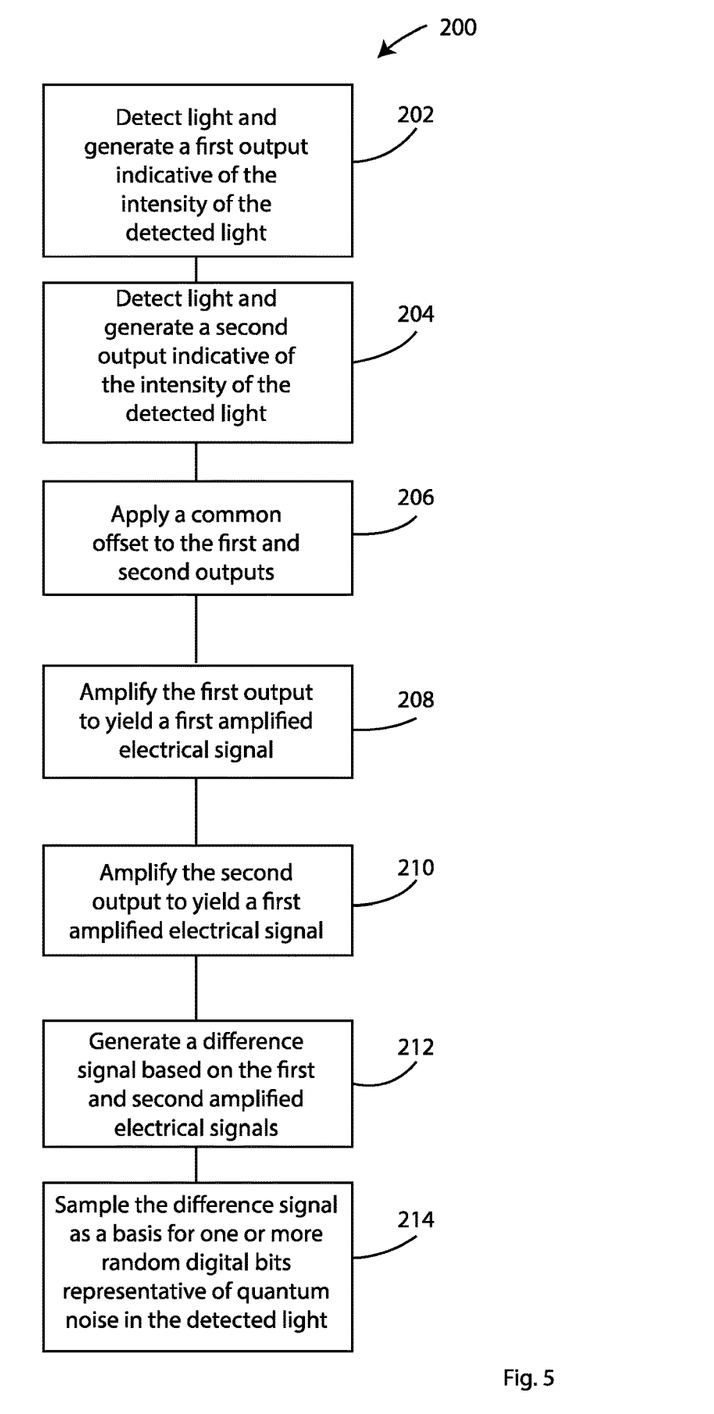
FIG. 5 shows a method of operation in accordance with one embodiment.

Turning to the illustrated embodiment of FIG. 5, a method of operation of a detector in accordance with one embodiment is shown and generally designated 200. The method 200 may include detecting light and generating a first output indicative of an intensity of the detected light, and detecting light and generating a second output indicative of an intensity of the detected light. Steps 202, 204.

A common offset may be applied to the first and second outputs. Step 206. For instance, a negative DC current may be applied to both the first and second outputs. As described herein, the first and second outputs may be isolated from each other to substantially prevent interaction therebetween. In other words, the common offset may affect both the first and second outputs while the first and second outputs may not affect each other due to isolation, such as by providing a diode (e.g., the first and second diodes 45A, 45B) between each of the first and second outputs and a source of the common offset (e.g., common offset circuitry 43).

Application of the common offset may be variable such that the common offset can be adjusted based on one or more sensed parameters of operation. For instance, based on a detected DC bias in the first and/or second outputs, the common offset may be applied to reduce or increase the DC bias. This way, the DC bias of the first and second outputs may be maintained to be within an operational range of the first and second amplifiers 44A, 44B. The common offset, as noted herein, may include noise. However, this noise is applied to both the first and second outputs, and may be removed from respective signals based on both outputs by differencing the respective signals.

The method 200 may include amplifying both the first output and the second output to yield respective first and second amplified signals. Steps 208, 210. The first and second amplified signals, which are based on the first and second outputs, may be differenced to yield a difference signal. Step 212. Noise potentially introduced into the first and second outputs by applying the common offset may be substantially absent from the difference signal. The differencing operation may be conducted via an analog differencing circuit 52 or via a digitally determined difference based on sampled forms of the first and second amplified signals.

In the illustrated embodiment, the difference signal may be sampled and used as a basis for generating one or more random bits of data. Step 214. The random bits of data may be representative of quantum noise present in the detected light and the first and second outputs.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A light detector comprising:
    a first light detector having a first output, the first light detector configured to provide a first electrical signal from the first output, the first electrical signal representing light intensity of light received by the first light detector;
    a first amplifier coupled to the first output of the first light detector, the first amplifier operable to amplify the first electrical signal to yield a first amplified electrical signal;
    a second light detector having a second output, the second light detector configured to generate a second electrical signal from the second output, the second electrical signal representing light intensity of light received by the second light detector;
    a second amplifier coupled to the second output of the second light detector, the second amplifier operable to amplify the second electrical signal to yield a second amplified electrical signal; and
    a common offset circuit operably coupled to the first and second outputs of the first and second light detectors, the common offset circuit operably coupled to the first and second amplifiers, the common offset circuit configured to apply a common offset to the first and second outputs, wherein the common offset circuit is configured to prevent interaction between the first and second amplifiers, whereby noise introduced to the first and second outputs by the common offset is common to the first and second outputs.

2. The light detector of claim 1 wherein the first and second electrical signals are indicative of quantum noise.

3. The light detector of claim 1 comprising processing circuitry operable to output a difference signal indicative of a difference between the first amplified electrical signal and the second amplified electrical signal.

4. The light detector of claim 3 wherein noise introduced to the first and second outputs by the common offset is absent from the difference signal that is output from the processing circuitry.

5. The light detector of claim 3 wherein the processing circuitry is operable to generate one or more random bits of data based on the difference signal, wherein the one or more random bits of data are indicative of quantum noise of light received by the first and second light detectors.

6. The light detector of claim 1 comprising conversion circuitry operable to convert the first amplified electrical signal to a first digitized signal representative of the first amplified electrical signal, the conversion circuitry operable to convert the second amplified electrical signal to a second digitized signal representative of the second amplified electrical signal.

7. The light detector of claim 6 wherein the conversion circuitry is operable to generate a digitized difference signal indicative of a difference between the first and second digitized signals, wherein noise introduced to the first and second outputs by the common offset is substantially absent from the digitized difference signal.

8. The light detector of claim 1 wherein the first and second electrical signals include a background signal superimposed with quantum noise.

9. The light detector of claim 1 wherein the common offset circuit includes a common DC current offset shared by the first and second outputs.

10. The light detector of claim 9 wherein the common offset circuit is a current sink that removes a current from the first and second outputs according to the common DC current offset.

11. The light detector of claim 9 wherein the common offset circuit includes first and second diodes operatively coupled to the first and second outputs, wherein the common DC current offset is applied to the first output via the first diode and to the second output via the second diode, wherein the first and second diodes substantially prevent interaction between the first and second amplifiers.

* * * * *